(12) United States Patent
Doerr et al.

(10) Patent No.: US 7,543,515 B2
(45) Date of Patent: Jun. 9, 2009

(54) ADJUSTING DEVICE FOR A TRANSMISSION

(75) Inventors: Wolfgang Doerr, Eichenau (DE); Zoltan Skriba, Budapest (HU)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/020,350

(22) Filed: Jan. 25, 2008

(65) Prior Publication Data

US 2008/0264191 A1 Oct. 30, 2008

Related U.S. Application Data

(63) Continuation of application No. PCT/EP2006/007313, filed on Jul. 25, 2006.

(30) Foreign Application Priority Data

Jul. 26, 2005 (DE) .................... 10 2005 034 864

(51) Int. Cl.
  *F16H 59/00* (2006.01)
  *F16H 61/00* (2006.01)
  *F16H 63/00* (2006.01)
(52) U.S. Cl. ............... 74/337.5; 74/335; 74/473.12
(58) Field of Classification Search ............ 74/335, 74/337.5, 473.12, 473.25, 473.28
See application file for complete search history.

(56) References Cited

U.S. PATENT DOCUMENTS

| | | | | |
|---|---|---|---|---|
| 5,590,563 A | * | 1/1997 | Kuwahata et al. | 74/337.5 |
| 5,867,092 A | * | 2/1999 | Vogt | 340/456 |
| 5,878,624 A | * | 3/1999 | Showalter et al. | 74/473.37 |
| 5,966,989 A | * | 10/1999 | Reed et al. | 74/331 |
| 6,370,980 B1 | * | 4/2002 | Olsson et al. | 74/473.24 |
| 6,722,219 B2 | | 4/2004 | Berger et al. | |
| 6,730,864 B2 | | 5/2004 | Hillebrand et al. | |
| 6,789,440 B2 | * | 9/2004 | Bigi | 74/337.5 |

FOREIGN PATENT DOCUMENTS

| | | |
|---|---|---|
| DE | 100 32 907 A1 | 2/2001 |
| EP | 1 152 174 A2 | 11/2001 |
| EP | 1 350 991 A1 | 10/2003 |
| FR | 2 707 360 A1 | 1/1995 |
| FR | 2 742 836 A1 | 6/1997 |

OTHER PUBLICATIONS

International Search Report dated Nov. 16, 2006 w/English translation (four (4) pages).
English translation of the International Preliminary Report dated Jun. 19, 2008 (Six (6) pages).

* cited by examiner

*Primary Examiner*—David D. Le
(74) *Attorney, Agent, or Firm*—Crowell & Moring LLP

(57) ABSTRACT

An adjusting device for a transmission is described. The device has at least one movable adjusting element, a plurality of sensors for detecting a position of the at least one movable adjusting element, which are arranged substantially parallel to one another, and a plurality of cam paths having sections of different heights, assigned to corresponding ones of the plurality of sensors. The device also includes a plurality of scanning elements coupled to the plurality of sensors for mechanically scanning the sections of different height, and at least one catch of each of the plurality of cam paths in which a latching element is engageable, wherein the plurality of sensors and the latching element are designed as a common component. The plurality of cam paths result in comparable stroke movements arising for each of the plurality of scanning elements.

13 Claims, 4 Drawing Sheets

ADJUSTING DEVICE FOR A TRANSMISSION

CROSS REFERENCE TO RELATED APPLICATIONS

This application is a continuation of international patent application number PCT/EP2006/007313, filed Jul. 25, 2006, designating the United States of America, the entire disclosure of which is incorporated herein by reference. Priority is claimed based on German patent application Ser. No. 10/2005/034 864.5, filed Jul. 26, 2005.

SUMMARY AND BACKGROUND OF THE INVENTION

The present invention relates to an adjusting device for a transmission, in particular for a motor vehicle transmission, with at least one movable adjusting element, the position of which is detected by at least one sensor, wherein a cam path is provided which has sections of different heights which are provided to be scanned mechanically by a scanning element coupled to the sensor, and wherein the cam path has at least one catch in which a latching element can engage.

Speed converters and also speed-torque converters and components thereof are in this context referred to by the term "transmission", in particular motor vehicle main transmissions, clutches, etc. are referred to by the term.

For controlling of transmissions of this type, input signals, produced, for example, by an operator or a controller, are converted into a mechanical movement of parts of the transmission. For example, during a change of gear speed or transmission ratio of a motor vehicle transmission, a selection and a shifting direction can be detected, can first be converted into movements of a selector lever and of a shift lever and then corresponding parts of the transmission can be moved. Conversely, the movements or positions, for example of the selector lever and shift lever, and the further parts of the transmission, such as, for example, the position of the shift forks have to be sensed.

According to the prior art, displacement sensors are used for the controlling of vehicle transmissions. The displacement sensors usually have a linearly movable pin. In this case, the sensor pin is coupled, for example, to the shift shaft in such a manner that a translatory movement of the shift fork leads to a linear movement of the sensor pin. The sensor is usually arranged in the lower oil chamber of the transmission and therefore exposed to high temperature and media loadings. For this reason, use is usually made of inductive displacement sensors which are very robust. In the case of these inductive sensors, the sensor pin moves in the interior of a coil. A movement, for example, of the shift shaft brings about a movement of the sensor pin which, in turn, causes a change in inductance in the coil. As an alternative, according to the prior art the linear movement, which is to be sensed, of the shift shaft can be fed to the displacement sensor via a cam path. For this purpose, sections of different heights are provided on the cam path, with different heights corresponding to certain positions of the shift shaft. These different heights are detected by a suitably arranged linear displacement sensor.

At the same time, the movement of adjusting elements, such as, for example, a shift rod, in the generic adjusting devices is usually influenced by latching devices. For this purpose, a latching element which is movable in the direction of the adjusting element and is prestressed in said direction is generally provided in the form of a pin which engages in corresponding catches. Before a movement of the adjusting element that guides the latching pin out of one of these catches, a certain counterforce has to be overcome.

The invention provides an adjusting device for transmissions, which has as few components as possible.

The adjusting device according to the invention improves on the generic prior art, for example, in that the sensor and the latching element are designed as a common component. In this manner, elements which are provided for the sensor functionality can likewise be used for the latching functionality. Given an appropriate configuration of the sensor, this enables the number of components to be reduced. In particular, latching positions can be provided at different heights in different sections of the cam path. In this case, the corresponding position of the adjusting element can be detected in the particular latching position.

In a preferred embodiment, it is provided that the sensor has a movable sensor element which is coupled mechanically to the scanning element or is formed integrally therewith. A movement of the sensor element leads here to a changing output signal of the sensor. The use of a separate scanning element, for example in the form of a finger, therefore permits greater freedom of design in terms of fitting the sensor.

In another exemplary embodiment, it is provided that the scanning element is prestressed in the direction of the cam path. As a result, the scanning element is in continuous mechanical contact with the cam path. The sensor can therefore reliably detect the instantaneous position or a change in position, which takes place at a particular instant, of the adjusting element, and at the same can secure the adjusting element in the latching positions provided.

Furthermore, in one embodiment, it can advantageously be provided that the scanning element simultaneously forms the latching element. In this manner, correct latching can be detected particularly reliably.

An advantageous embodiment arises in particular by the cam path being provided to be arranged at least in some sections in an oil chamber of a transmission. This is advantageous in many cases, since the adjusting elements to be overcome are located there.

Furthermore, the invention can advantageously be implemented in that the sensor is provided to be arranged at least in some sections outside an oil chamber of a transmission. The sensor can therefore be fitted outside an environment unfavorable for it and therefore a more cost-effective structural form and/or a structural form having greater reliability can be selected for the sensor. For example, the sensor may be integrated into the cover of a transmission. Only the lower side of the sensor is therefore in contact with the oil chamber and exposed to the corresponding high loadings there.

Furthermore, it can be provided in an advantageous manner that the cam path is coupled mechanically to the adjusting element or is arranged thereon. By using its scanning element, the sensor can thus detect the mechanical movement of the adjusting element, which movement is transmitted to the cam path, and can be secured by a catch in an appropriate position of the adjusting element. For example, the cam path may also be integrated directly into the shape of the adjusting element. This constitutes an only insignificantly higher outlay on construction and production.

In a particularly preferred embodiment, it is provided that the sections of the cam path of different heights are arranged two-dimensionally. As a result, two movement directions which are independent of each other or the instantaneous position of the adjusting element with respect to two independent movement directions can be detected by just one sensor and corresponding latching positions made available. In this case, for the unambiguous detection of each discrete position to be detected, each position can be assigned an unambiguous height on the two-dimensional cam path. As an alternative, however, a plurality of positions having an identical height may also be coded in order to form a group of positions which is to be treated identically in terms of control.

Furthermore, the invention can be implemented in such a manner that the adjusting element can execute both a translational and a rotational movement, with both an angular measurement and a linear displacement measurement taking place via the sensor. Such a combined detection of a linear displacement measurement and an angle size by a single sensor reduces the complexity of the adjusting device both with respect to the number of sensors and with respect to the outlay on evaluation.

A further embodiment is advantageously developed by a plurality of sensors being provided, said sensors being arranged at least essentially parallel to one another. The parallel orientation of a plurality of sensors makes the electric connection of the sensors easier structurally and simplifies the installation thereof.

In particular, the invention can preferably be implemented in such a manner that the angular positions of a selector lever and of a shift lever and the position of at least one shift fork of the transmission are detected with the plurality of sensors. All of the position information necessary for controlling the transmission can thereby be detected.

Furthermore, it is advantageous in particular that the plurality of sensors is assigned a common evaluation circuit or a plurality of least similar evaluation circuits. The use of at least similar evaluation circuits in as few as possible a number—in the ideal case only one evaluation circuit—results in a significant reduction of costs.

It is likewise preferably provided that the plurality of sensors is assigned a corresponding plurality of cam paths having sections of different heights and a corresponding plurality of scanning elements, with the cam paths being designed in such a manner that comparable stroke movements arise for the scanning elements. Thus, on account of the comparable stroke movements, the same sensors can be used in spite of the different movements carried out by the adjusting elements, which advantageously reduces the number of different components within the adjusting device.

The likewise advantageous embodiment makes provision for the sensor to be an inductive displacement sensor. Inductive displacement sensors are suitable in particular for use in environments with a high temperature and/or media loading and can detect both translational and rotational movements by the cam path.

The exemplary embodiments of the invention provide combining the detection of the position and of the movement direction of an adjusting element by the provision of a cam path with a securing of the adjusting element by provision of catches in or on the cam path. This makes it possible to reduce the number of components. Furthermore, two independent movement directions can be detected with one sensor with the aid of a two-dimensional cam path.

Further refinements and special features of the invention are set forth in the following description of preferred embodiments.

BRIEF DESCRIPTION OF THE DRAWINGS

The invention is now explained by way of example using preferred embodiments and with reference to the accompanying drawings, in which.

DETAILED DESCRIPTION OF THE DRAWINGS

The exemplary embodiments illustrated here of the adjusting device according to invention are provided for a three-speed main transmission with a reverse gear. Of course, transmissions of a higher or a lower number or else groups of transmissions and combinations of transmissions can be provided by the device according to the invention. Furthermore, in this context, the term "transmission" is, in particular, also to include clutches, parts thereof, and other adjustable elements.

Figure 1:
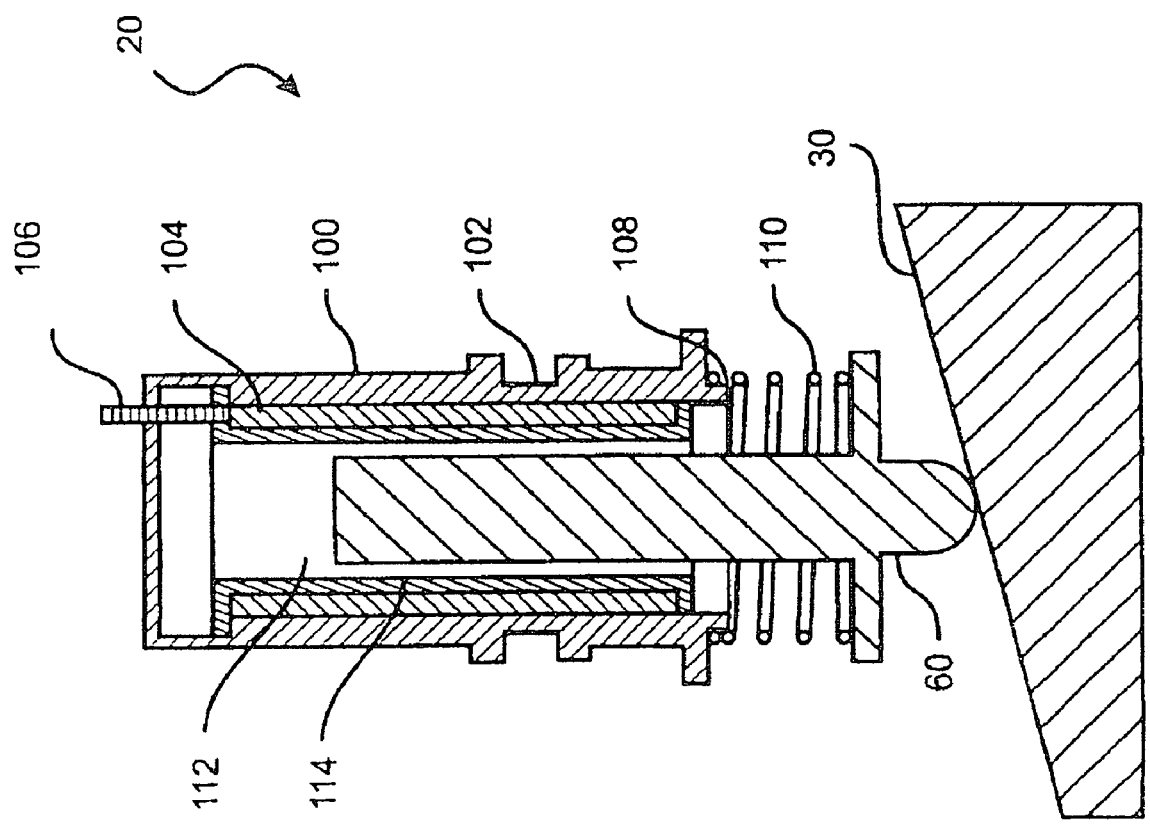
FIG. 1 shows a sectional view of a sensor operating according to an embodiment of the invention, with a scanning element and cam path.

FIG. 1 shows a sectional view of an exemplary sensor 20 according to the invention with a scanning and latching element 60 and cam path 30. The operation of the sensor is first of all to be explained per se in conjunction with FIG. 1. The sensor 20 according to the invention has a cylindrical housing 100 which is provided with an encircling fastening groove 102. A coil 104 is arranged within the housing. The coil 104 is connected to a signal line 106 which leads out of the housing 100. The scanning and latching element 60 which extends along the axis of symmetry of the sensor 20, and in this case forms the movable sensor and latching element, is located within the coil 104. The scanning element 60 protrudes out of the housing 100 at the opening 108 thereof and is coupled mechanically to said housing by a spring 110. The spring 110 prestresses the scanning element 60 against a cam path 30 and thus exerts a compressive force on the scanning element 60, pressing the latter away from the housing 100 of the sensor 20 and towards the cam path 30. The coil 104 of the sensor 20 is delimited in relation to the internal space 112 of the sensor 20 and therefore also with respect to the scanning element 60 by a sheathing 114. The housing 100 of the sensor 20 is connected, for example in a positionally fixed manner, to a housing of a transmission (not illustrated) via the circumferential groove 102, and the cam path 30 can be connected in a positionally fixed manner to an adjusting element (not depicted) which is to be sensed.

The cam path 30 which is connected to a moving adjusting element moves relative to the housing 100 of the sensor 20 during a corresponding change in position of the adjusting element. On account of the mechanical coupling of the scanning element 60 to the cam path 30 via the spring 110, the scanning and latching element 60 remains in continuous contact with the cam path 30. In this case, the latching element 60 is, in particular, also pressed into an existing latching depression (not illustrated here) and provides resistance to a movement of the adjusting element that goes beyond said depression. The changing height of the cam path 30 relative to the lower edge 108 of the housing 100 brings about a movement of the scanning element 60 within the interior 112 of the sensor 20. In this case, electric pulses are generated in the induction coil 104 of the sensor 20 and can be supplied via the electric signal line 106 to a suitable evaluation circuit (not depicted here) where they can be processed.

Figure 2:
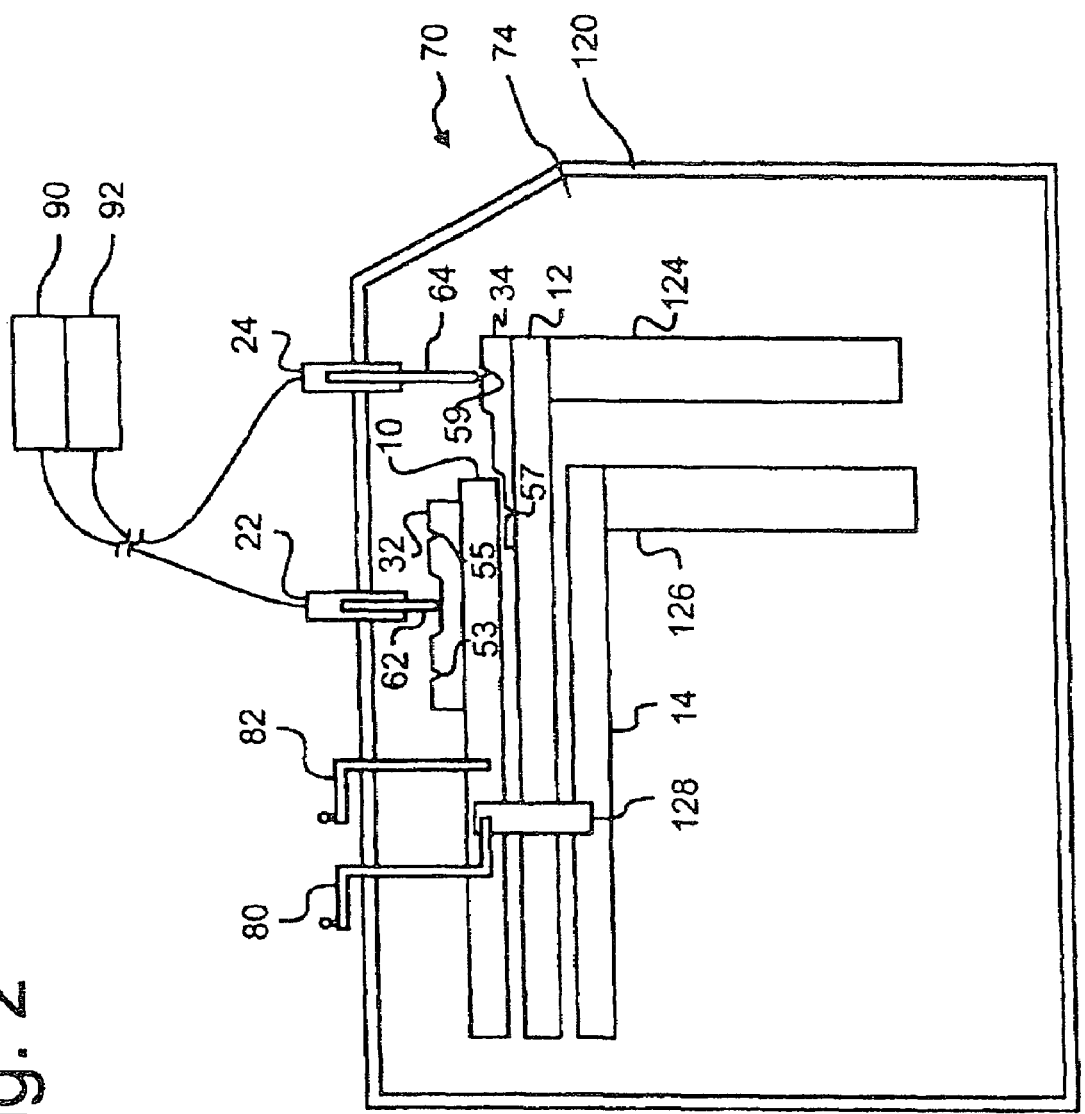
FIG. 2 shows a sectional view of an embodiment according to the invention of the adjusting device, installed in a transmission.

FIG. 2 shows a sectional view of an exemplary embodiment according to the invention of the adjusting device, installed in a transmission. This schematic illustration shows parts of a transmission 70. Parts which are not of specific interest here for the illustration and explanation, such as, for example, gear wheels, drive shafts, etc. have been omitted for reasons of clarity. Two shift rods 12, 14 with the associated shift forks 124, 126 are illustrated within the housing of the three-speed main transmission 70 with a reverse gear. Furthermore, an adjusting device, comprising an adjusting element 10, selector lever 80, shift lever 82 and an actuating element 128, is depicted. Two inductive displacement sensors, 22, 24 are integrated vertically into the housing of the transmission controller. The sensors 22, 24 correspond in their construction to the sensor 20 described with respect to FIG. 1 and illustrated there. The scanning elements 62, 64 of the sensors 22, 24 are in mechanical contact with the corresponding cam paths 32, 34. In this case, the first cam path 32 is arranged on the adjusting element 10 and is designed as a two-dimensional cam path. The cam path 32 has latching sections 53, 55. The movable sensor element of the induction sensor 22, which sensor element forms a scanning and latching element 62, engages in said latching sections. The second cam path 34 is provided in the form of a one-dimensional cam path on the shift rod 12 and is provided with latching sections 57, 59. The sensors 22, 24 are connected to corresponding evaluation circuits 90, 92 via signal lines.

The information about the selection and shifting direction, which information is required for the shifting of the transmission 70, is passed to the transmission 70 via a movement of the selector lever 80 or of the shift lever 82. The selector lever 80 sets the adjusting element 10 into a rotational movement about its longitudinal axis via a correspondingly designed mechanism, in particular via the actuating element 128, therefore produces a mechanical coupling between the adjusting element 10 and the shift rod 12, 14 to be selected and releases the corresponding other shift rod 12, 14. By contrast, during a shifting movement, the shift lever 82 sets the adjusting element 10 into a linear movement along its longitudinal axis, the adjusting element, in the process, entraining a shift rod 12, 14 which is correspondingly coupled to the adjusting element 10. The corresponding released shift rod 12, 14 is not moved. In this manner, those parts (not illustrated) of the transmission 70 that are coupled to the shift forks 124, 126 can be engaged in the force flux or removed therefrom. The rotational and translational movements carried out by the adjusting element 10 are transmitted via the two-dimensional cam path 32 to the scanning and latching element 62 of the sensor 22.

Figure 3:
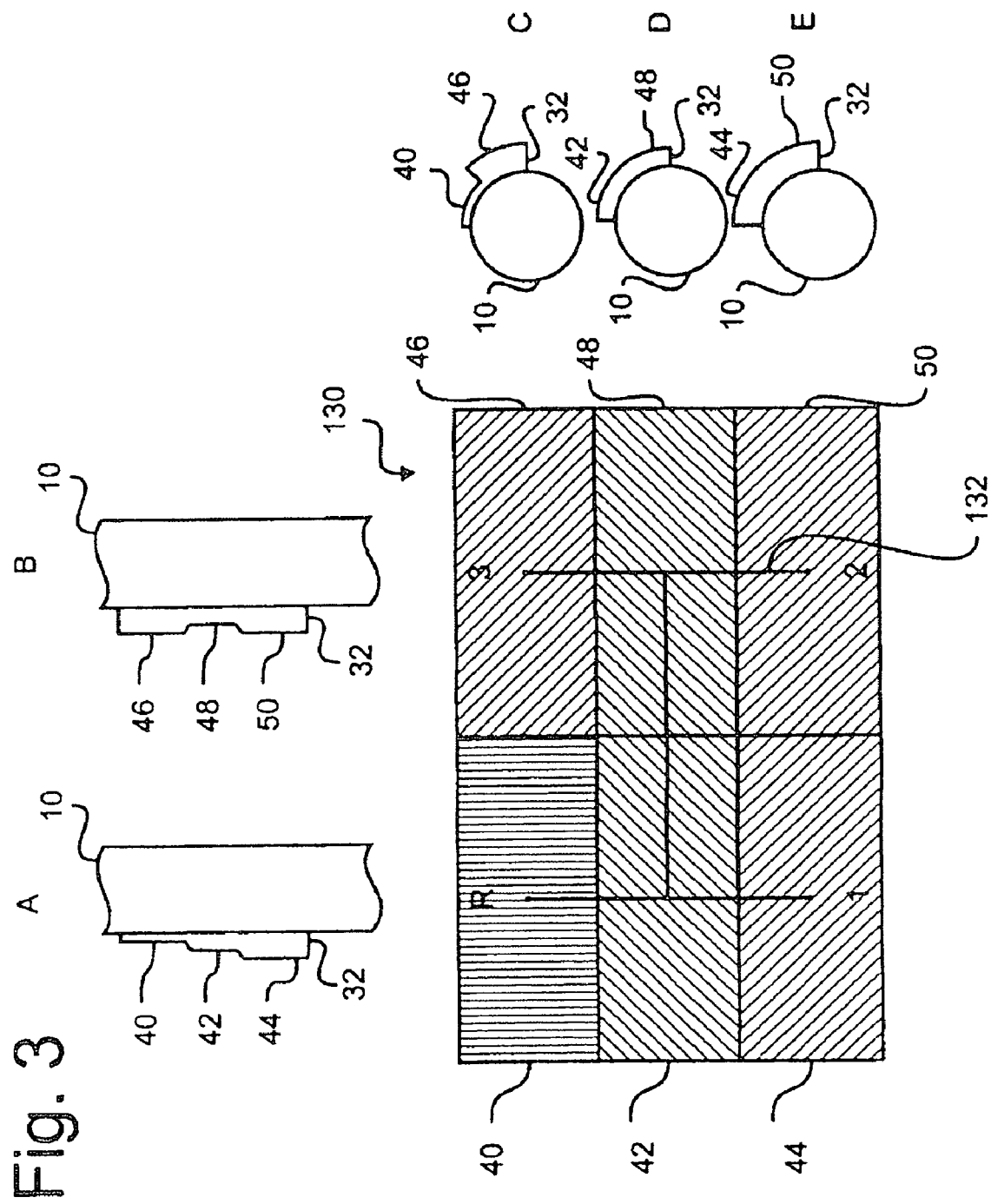
FIG. 3 shows multiple sectional views of a cam path according to the invention and a schematic illustration of the same.

A detailed illustration of the cam path 32 and its functionality can be found in FIG. 3 and in the associated description. The positions corresponding in each case to an end position of the shift rod 10 are provided with latching depressions 53, 55. In this exemplary illustration, two latching sections 53, 55 are illustrated by way of example, but more latching positions can also be provided. The prestressing of the latching and sensor element 62 in the direction of the adjusting element 10 enables it to engage in the latching sections 53, 55 and thus to secure the adjusting element 10 in the respective position.

The change in inductance, which is caused by the scanning and sensor element 62, within the sensor 22 is transmitted as an electric measurement signal via a corresponding signal line to the evaluation circuit 90 and evaluated there. The instantaneous position of the adjusting element 10 can thereby be recognized with the aid of the correspondingly designed cam path 32 and just one assigned sensor 22. The positions of the shift rod 12 can be detected in a similar manner. The latter can take up three positions. This is reflected in three heights of the cam path 34, which heights correspond to a neutral position and two end positions. The two latching sections 57, 59 of the cam path 34, which latching sections are assigned to the end positions, secure the shift rod 12 in said positions. During changes of position, the scanning pin 64 transmits the changed height as a measurement signal via a signal line to the evaluation circuit 92. The evaluation circuits 90, 92 can be of essentially identical design, since the changes in height of the corresponding cam paths can be designed in a similar manner. Since, under some circumstances, the two-dimensional cam path 32 requires a greater number of heights or a more precise differentiation between the heights, two similar evaluation circuits 90, 92 are provided in this exemplary embodiment. The sensors 22, 24, because they are integrated vertically into the transmission cover, are removed essentially from the lower internal space 74 of the transmission. Only the lower side of the sensors 22, 24 and the scanning elements 62, 64 protrude into the oil chamber 74.

FIG. 3 shows sectional views of a cam path according to the invention and a schematic illustration of the same. The illustrated longitudinal sections A, B run along the longitudinal axis of the adjusting element 10 of FIG. 2, the cross sections C, D, E run perpendicularly to the longitudinal axis of the adjusting element 10. In this figure, the illustration of the latching sections has been omitted for reasons of clarity. The sectional views and the "developed view" 130 of the cam path 32 and the shift scheme 132, which is placed over it, of the three-speed main transmission with a reverse gear and with two shift rods illustrate the construction and functionality of the cam path 32, in particular the shifting states arising from the movements of the adjusting element 10, and the correspondingly assigned heights of the cam path 32. The "developed view" 130 of the cam path 32 shows nine fields 40-50. Said fields 40-50 correspond to sections of the cam path 32, with the different hatchings indicating the different heights of the individual sections 40-50.

The "developed view" 130 is oriented in such a manner that the longitudinal axis of the adjusting element 10 runs perpendicularly, as also illustrated in the longitudinal sections A, B. The shift scheme 132, which is placed over it, indicates which field 40-50 of the cam path 32 enters into contact with the scanning element 32 at corresponding positions of the selector and shift levers 80, 82. The elements 44, 46, 50 which are assigned the forward gears have a greatest height, the elements 42, 48 which represent neutral positions of the transmission have a medium height and the field 40 which is assigned to an engaged reverse gear has a lowest height. A movement which takes place in the vertical direction, i.e., for example, from a field 50 via a field 48 to field 46, corresponds to a movement of the adjusting element 10 along its longitudinal axis and therefore to a shifting movement. A movement in the horizontal direction, for example from field 42 to field 48, corresponds to a rotation of the adjusting element 10 about its longitudinal axis, i.e. to a selection movement.

The longitudinal sections A, B show the height profile of the cam path 32 as scanned by the scanning element 62 of the sensor 22 of FIG. 2 during different rotational positions of the adjusting element 10. In this case, the profile of the cam path 32 of the cross-sectional view A shows the height profile during a change of gear speed which takes place from first gear to reversing gear R or vice versa. In an analogous manner, the cross-sectional view B shows the height profile of the cam path 32 during a change of gear speed from second gear to third gear or vice versa. By contrast, the sectional views C, D, E show cross sections perpendicular to the longitudinal axis of the adjusting element 10. The sectional view C shows the height ratios of the cam path 32 that prevail between the field 40 corresponding to the reverse gear R and the field 46 corresponding to the forward third gear. The sectional view D shows that there is a uniform medium height on the cam path 32 in the neutral positions of the fields 42 and 48. The sectional view E in turn shows the greatest height in the cam path 32, which is present on fields 44 and 50 which both correspond in each case to the engaged forward first and second gears.

During a movement of the adjusting element 10 along its longitudinal axis, which is caused by a corresponding movement of the shift lever 82, the scanning element 62 of the sensor 22 scans the cam path 32. In this case, the scanning element can either move along the fields 46, 48, 50 and can therefore constitute a change of gear speed between second gear and third gear. As an alternative, it can move between the fields 40, 42, 48 and can therefore depict a change of gear speed between reverse gear R and forward first gear. During the first-mentioned movement, the scanning element can differentiate the forward second and third gears from the neutral position which corresponds to the field 48. During the second movement mentioned, the reverse gear R, the neutral position and the forward gear can be sensed on account of the differently allocated heights. The change between the two neutral positions, which are coded by fields 42 and 48, does not need to be differentiated in this embodiment.

Of course, the illustrated H-shift scheme with four end positions is just one exemplary embodiment. More complex adjusting devices with a plurality of shift rods to be selected or an adjusting device with just one shift rod may also be controlled in this manner. Furthermore, the restriction implemented here to three heights which correspond to a reverse gear, the neutral positions and the forward gears is likewise arbitrary. According to the invention, each position to be taken up can be allocated an individual height. Under some circumstances, it is even possible, given appropriate fine scanning of the cam path, to scan a substantially larger number of intermediate positions.

Figure 4:
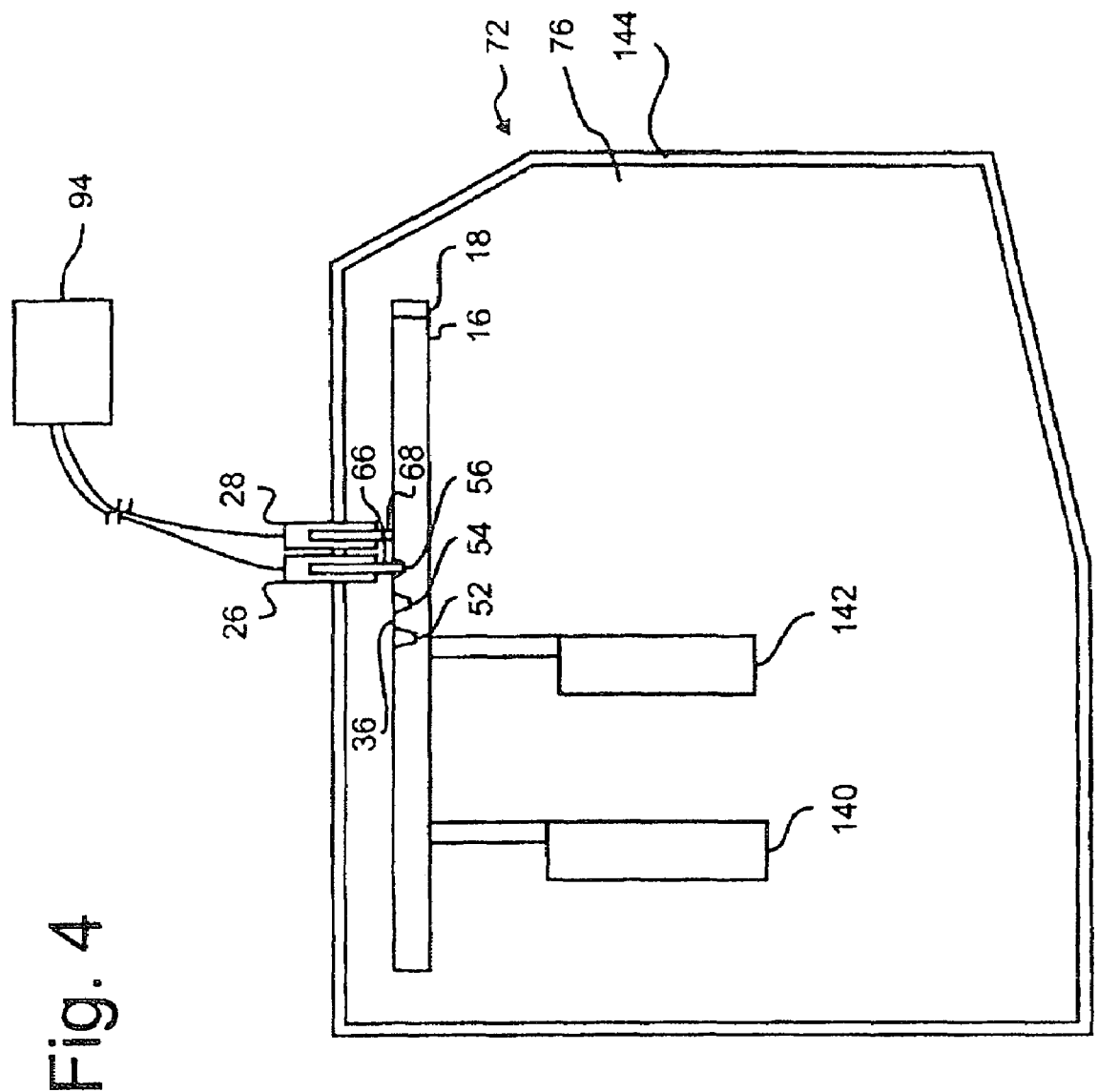
FIG. 4 shows a sectional view of an alternative embodiment of the adjusting device according to the invention installed in a transmission.

FIG. 4 shows an exemplary sectional view of an alternative embodiment of the adjusting device according to the invention, installed in a transmission. The motor vehicle transmission 72 illustrated has two shift lineals 16, 18 on which corresponding shift forks 140, 142 are fitted. The shift lineals 16, 18 both each have one cam path 36. The cam path 36 of the shift lineal 16 is visible and that of the shift lineal 18 is concealed by the shift lineal 16 located in front of it. The cam paths 36 have latching sections 52, 54, 56. The movable sensor elements of induction sensors 26, 28, which sensor elements form scanning elements 66, 68, engage in said latching sections. The exemplary sensors 26, 28 are integrated in the housing 144 of the transmission 72 and they therefore protrude at least partially out of the oil chamber 76 of the transmission 72. The electric signals generated by the sensors 26, 28 are supplied via signal lines to a common evaluation circuit 94 for evaluation.

The sensors 26, 28 correspond in their basic construction to the sensor 20 of FIG. 1. At the same time, in addition to the generation of inductive signals, the scanning pins are used to latch the shift lineals 16, 18 in the latching positions 52, 54, 56. During a movement of the shift lineals 16, 18 along their longitudinal axis, the scanning elements 66, 68 slide along the cam paths 36. On account of a correspondingly preselected prestress, a force has to be overcome between the individual latching positions 52-56. The different latching positions 52-56 are coded by different heights and can thus serve to establish the particular position of the shift lineal 16, 18.

The features of the invention which are disclosed in the description above, in the drawings and the claims may be essential both individually and in any desired combination in order to realize the invention.

The following list of reference numerals is provided to facilitate understanding of the present specification and drawings.

10 Adjusting element
12 First shift rod
14 Second shift rod
16 First shift lineal
18 Second shift lineal
20 Induction sensor
22 Sensor for a two-dimensional cam path
24 Sensor for a one-dimensional cam path
26 Latching sensor
28 Latching sensor
30 Cam path
32 Two-dimensional cam path
34 One-dimensional cam path
36 Latching cam path
40 Cam path section, low height
42 Cam path section, medium height
44 Cam path section, great height
46 Cam path section, great height
48 Cam path section, medium height
50 Cam path section, great height
52, 54 Latching sections of the one-dimensional cam path
53, 55 Latching sections of the two-dimensional cam path
55, 57 Latching section of the one-dimensional cam path
60 Scanning element
62 Scanning element for the two-dimensional cam path
64 Scanning element for the one-dimensional cam path
66 Scanning element for the latching cam path
68 Scanning element for the latching cam path
70 Transmission
72 Transmission
74 Oil chamber
76 Oil chamber
80 Selector lever
82 Shift lever
90 Evaluation circuit
92 Evaluation circuit
94 Evaluation circuit
100 Housing
102 Encircling groove
104 Coil
106 Electric connections
108 Housing opening
110 Spring
112 Internal space
114 Sheathing
120 Transmission housing
124 First shift fork
126 Second shift fork
128 Actuating device
130 Developed view of the two-dimensional cam path
132 Shift scheme
140 First shift fork
142 Second shift fork
144 Transmission housing
A, B Longitudinal section along the longitudinal axis of the adjusting element 10
C, D, E Cross sections perpendicular to the longitudinal axis of the adjusting element 10

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. An adjusting device for a transmission, comprising:
   at least one movable adjusting element;
   a plurality of sensors for detecting a position of the at least one movable adjusting element, the plurality of sensors being arranged substantially parallel to one another;
   a plurality of cam paths, having sections of different heights, assigned to corresponding ones of the plurality of sensors;
   a plurality of scanning elements coupled to the plurality of sensors for mechanically scanning the sections of different height; and
   at least one catch of each of the plurality of cam paths in which a latching element is engageable, wherein the plurality of sensors and the latching element are designed as a common component,
   wherein the plurality of cam paths are designed to result in comparable stroke movements arising for each of the plurality of scanning elements.

2. The adjusting device as claimed in claim 1, wherein the plurality of sensors comprise a movable sensor element that is one of coupled mechanically and formed integrally with at least one of the plurality of scanning elements.

3. The adjusting device as claimed in claim 1, wherein the plurality of scanning elements is prestressed in the direction of the cam path.

4. The adjusting device as claimed in claim 1, wherein at least one of the plurality of scanning elements simultaneously forms the latching element.

5. The adjusting device as claimed in claim 1, wherein the plurality of cam paths is adapted to at least in some sections be arranged in an oil chamber of the transmission.

6. The adjusting device as claimed in claim 1, wherein the plurality of sensors is adapted to be arranged at least in some sections outside an oil chamber of the transmission.

7. The adjusting device as claimed in claim 1, wherein the plurality of cam paths is one of coupled mechanically to and arranged on the at least one adjusting element.

8. The adjusting device as claimed in claim 1, wherein the sections of different heights of the cam path are arranged two-dimensionally.

9. The adjusting device as claimed in claim 1, wherein the plurality of sensors is assigned one of a common evaluation circuit and a plurality of substantially similar evaluation circuits.

10. The adjusting device as claimed in claim 1, wherein the plurality of sensors comprises an inductive displacement sensor.

11. The adjusting device as claimed in claim 1, wherein the transmission comprises a motor vehicle transmission.

12. An adjusting device for a transmission, comprising:
    at least one movable adjusting element;
    a plurality of sensors for detecting a position of the at least one movable adjusting element, the plurality of sensors being arranged substantially parallel to one another;
    a plurality of cam paths, having sections of different heights, assigned to corresponding ones of the plurality of sensors;
    a plurality of scanning elements coupled to the plurality of sensors for mechanically scanning the sections of different height; and
    at least one catch of each of the plurality of cam paths in which a latching element is engagable, wherein the plurality of sensors and the latching element are designed as a common component,
    wherein the plurality of cam paths are designed to result in comparable stroke movements arising for each of the plurality of scanning elements, and
    the at least one movable adjusting element is adapted to execute both a translational and a rotational movement, whereby both an angular measurement and a linear displacement measurement take place via the plurality of sensors.

13. The adjusting device as claimed in claim 12, wherein the angular positions of a selector lever and of a shift lever and the position of at least one shift fork of the transmission are detected with the plurality of sensors.

* * * * *